US007301514B2

(12) United States Patent
Kasai

(10) Patent No.: US 7,301,514 B2
(45) Date of Patent: Nov. 27, 2007

(54) ELECTRONIC CIRCUIT, ELECTRONIC DEVICE, ELECTRO-OPTICAL DEVICE, AND ELECTRONIC APPARATUS

(75) Inventor: Toshiyuki Kasai, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 328 days.

(21) Appl. No.: 10/452,201

(22) Filed: Jun. 3, 2003

(65) Prior Publication Data

US 2004/0036684 A1 Feb. 26, 2004

(30) Foreign Application Priority Data

Jun. 7, 2002 (JP) ............................ 2002-167777
Jun. 2, 2003 (JP) ............................ 2003-157387

(51) Int. Cl.
*G09G 3/30* (2006.01)
*G09G 5/00* (2006.01)
*G09G 3/10* (2006.01)
*G06F 3/038* (2006.01)

(52) U.S. Cl. ...................... 345/80; 345/205; 315/169.3

(58) Field of Classification Search .................. 345/30, 345/55, 63, 66, 67, 74.1, 75.2, 76, 77, 80, 345/87, 103, 90-92, 94, 98, 100, 204, 205, 345/206, 208, 210, 505, 536, 560, 690; 315/169.3; 313/483, 495, 500, 504
See application file for complete search history.

(56) References Cited

U.S. PATENT DOCUMENTS 4,823,027 A * 4/1989 Takahashi .................... 327/94
4,939,472 A * 7/1990 Uchida et al. .............. 327/339
5,017,924 A * 5/1991 Guiberteau et al. ......... 342/195
5,041,823 A 8/1991 Johnson et al. ............... 345/94
5,252,957 A * 10/1993 Itakura ........................ 345/98
5,341,050 A * 8/1994 Mellissinos et al. ........ 327/355
5,376,841 A * 12/1994 Itakura et al. ................ 327/94
5,633,653 A 5/1997 Atherton ...................... 345/98
5,703,608 A * 12/1997 Kuga .......................... 345/99
6,359,605 B1 3/2002 Knapp et al. ................. 345/76
6,522,315 B2 2/2003 Ozawa et al. ................. 345/92

(Continued)

FOREIGN PATENT DOCUMENTS

EP 1 486 942 A2 12/2004

(Continued)

OTHER PUBLICATIONS

Images from earliest Priority Document of EP 1 486 942 A1.

*Primary Examiner*—Jeff Piziali
(74) *Attorney, Agent, or Firm*—Oliff & Berridge, PLC

(57) ABSTRACT

The invention provides an electronic circuit, an electronic device and an electronic apparatus, which are capable of forming a simple circuit. A first buffer circuit is formed of second, third and sixth transistors and a first capacitor. A second buffer circuit is formed of fourth, fifth and seventh transistors and a second capacitor. The drain of the second transistor of the first buffer circuit and the drain of the fourth transistor of the second buffer circuit are connected to the first transistor. Furthermore, the drain of the sixth transistor of the first buffer circuit is connected to the drain of the seventh transistor of the second buffer circuit through an analog output terminal.

11 Claims, 7 Drawing Sheets

U.S. PATENT DOCUMENTS

| | | | | |
|---|---|---|---|---|
| 6,731,273 | B2 * | 5/2004 | Koyama et al. | 345/204 |
| 6,853,370 | B2 * | 2/2005 | Numao | 345/204 |

FOREIGN PATENT DOCUMENTS

| | | | |
|---|---|---|---|
| JP | A 03-125205 | | 5/1991 |
| JP | A 05-020890 | | 1/1993 |
| JP | A 05-198197 | | 8/1993 |
| JP | 06-202583 | | 7/1994 |
| JP | A 11-305739 | | 11/1999 |
| JP | A 11-345497 | | 12/1999 |
| JP | A 2000-040924 | | 2/2000 |
| JP | A 2000-081920 | | 3/2000 |
| JP | A 2000-122608 | | 4/2000 |
| JP | A 2000-200069 | | 7/2000 |
| JP | A 2000-293245 | | 10/2000 |
| JP | A 2001-042827 | | 2/2001 |
| JP | A 2001-245212 | | 9/2001 |
| JP | A 2002-008858 | | 1/2002 |
| JP | A 2003-195815 | | 7/2003 |
| JP | A 2003-288045 | | 10/2003 |
| WO | WO98/36407 | | 8/1998 |
| WO | WO 98/48403 | | 10/1998 |
| WO | WO 01/26088 | A1 | 4/2001 |
| WO | WO 01/75853 | A1 | 10/2001 |

* cited by examiner

【Fig. 1】
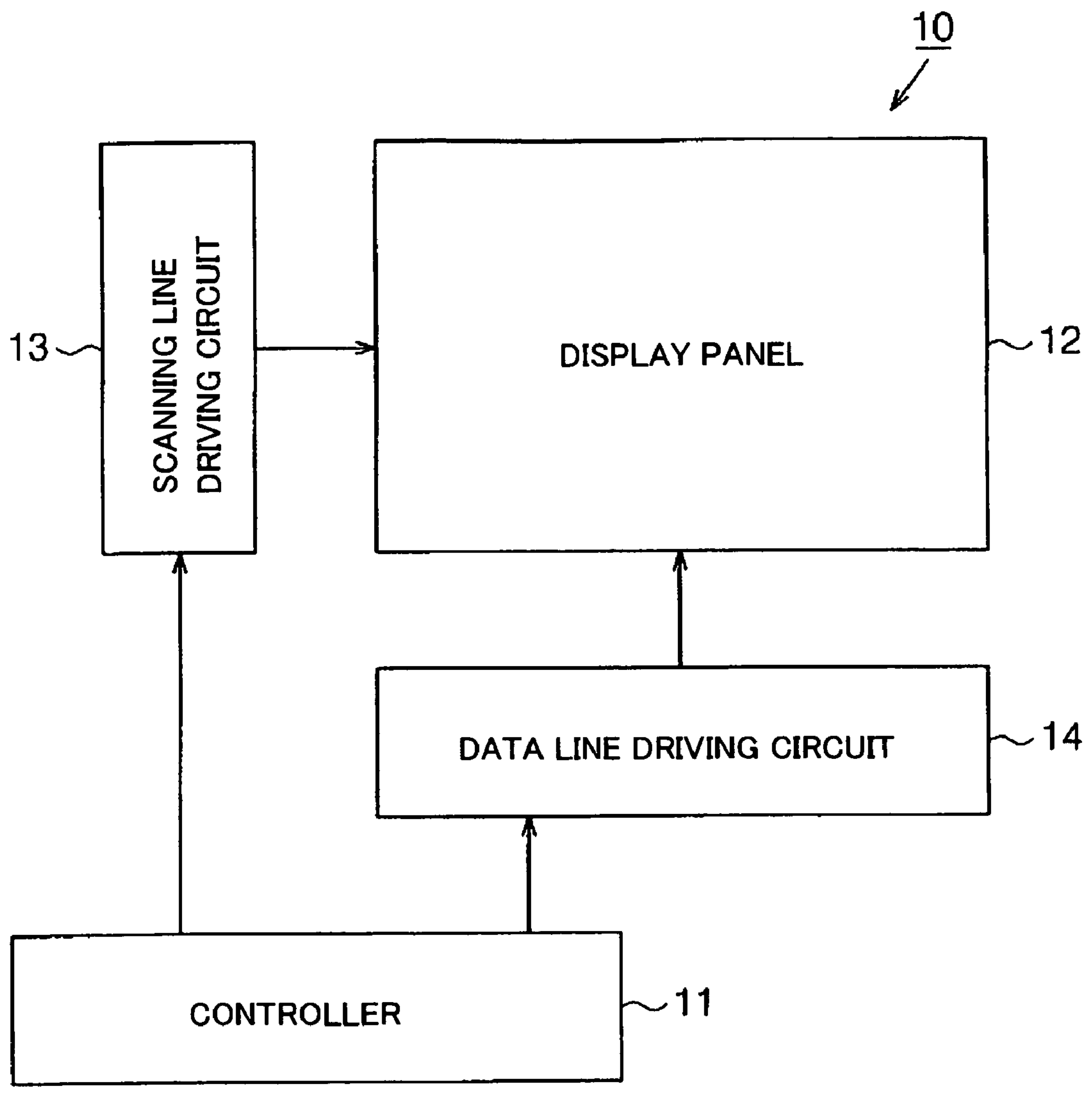

【Fig. 2】
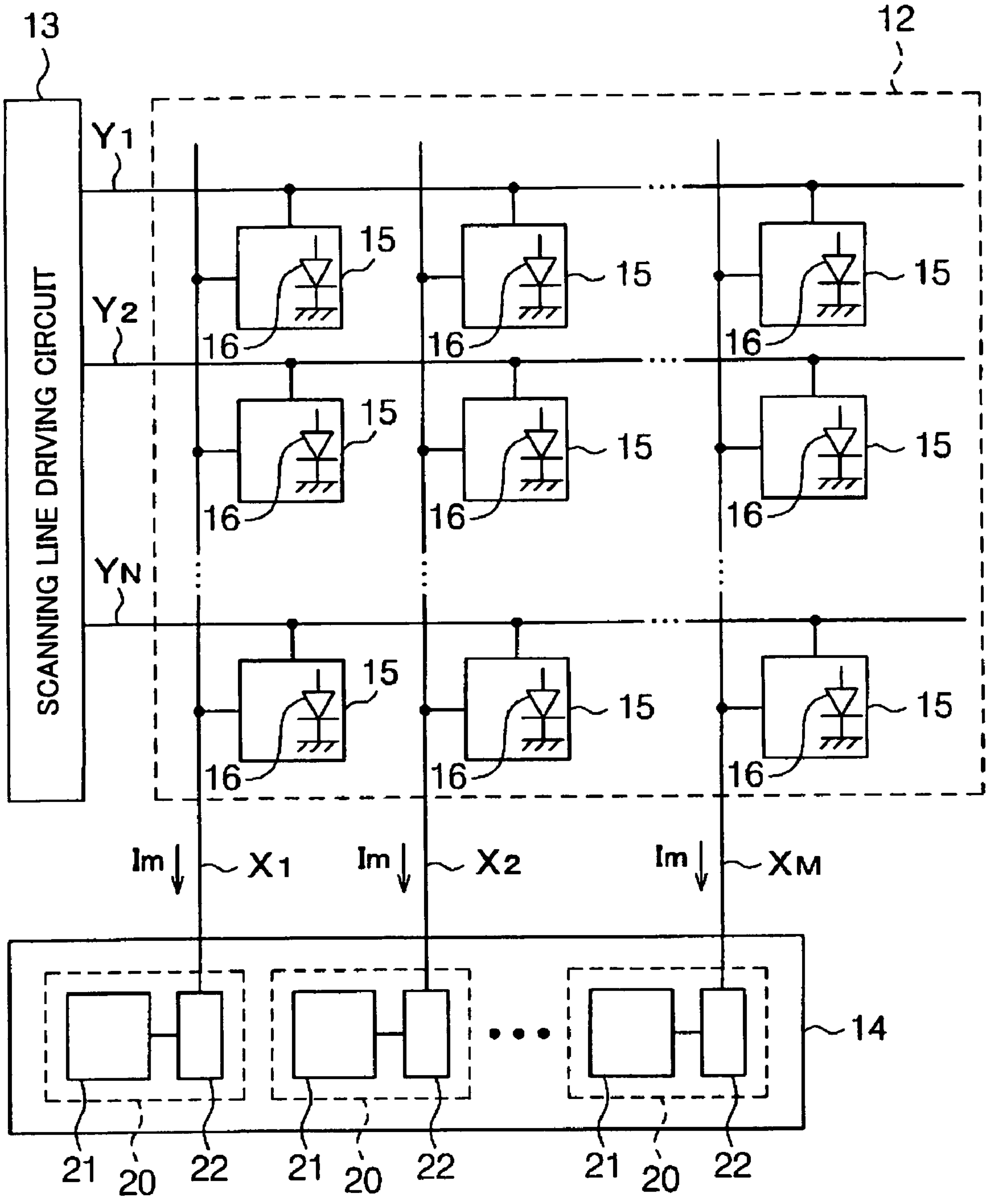

【Fig. 3】
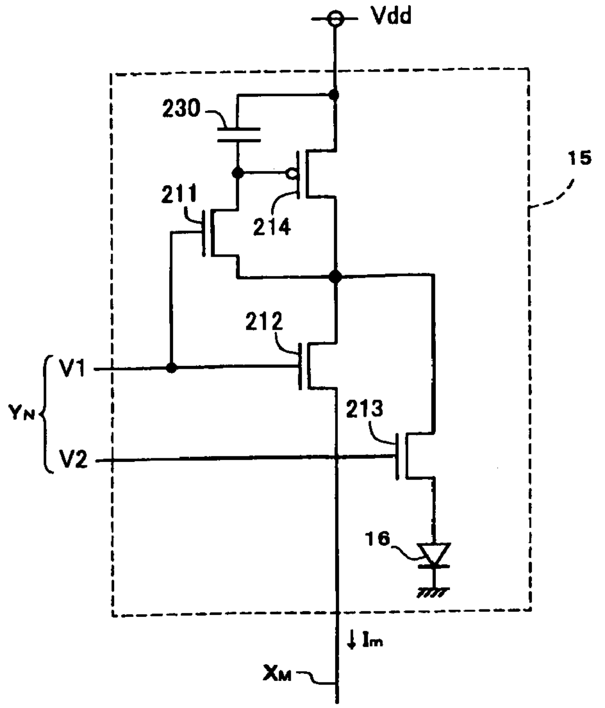
【Fig. 4】
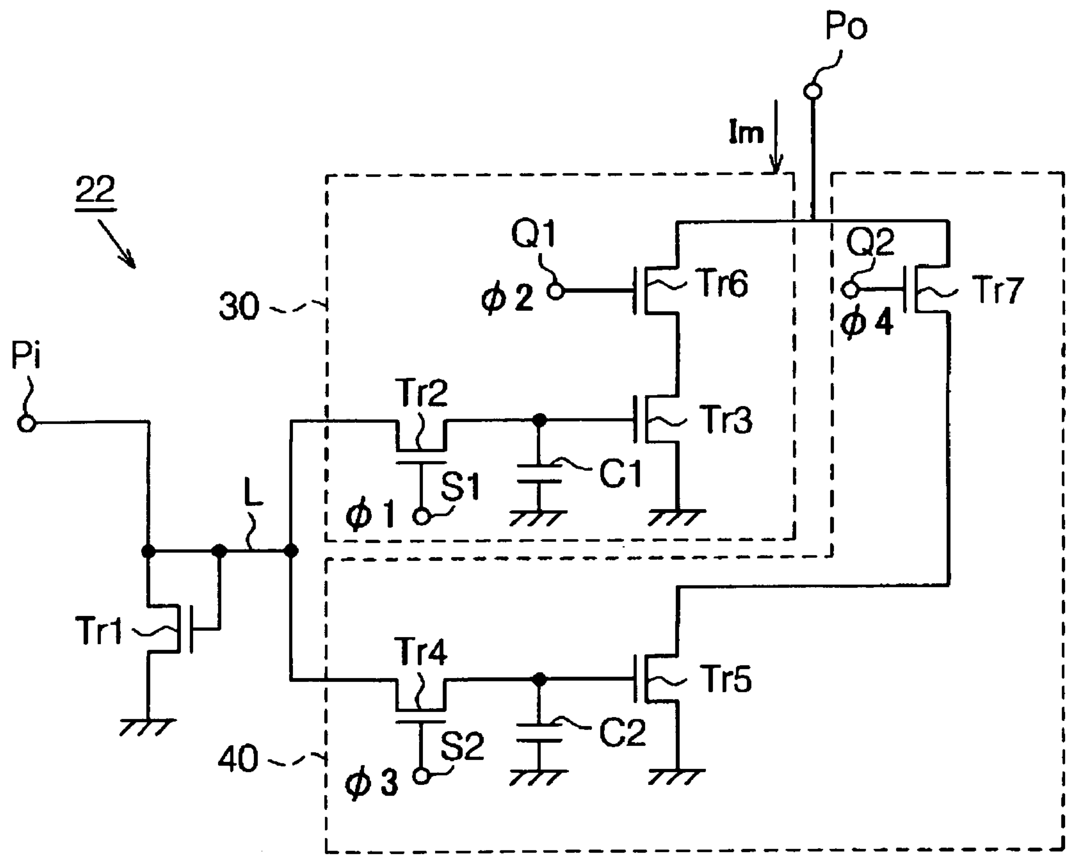

【Fig. 5】
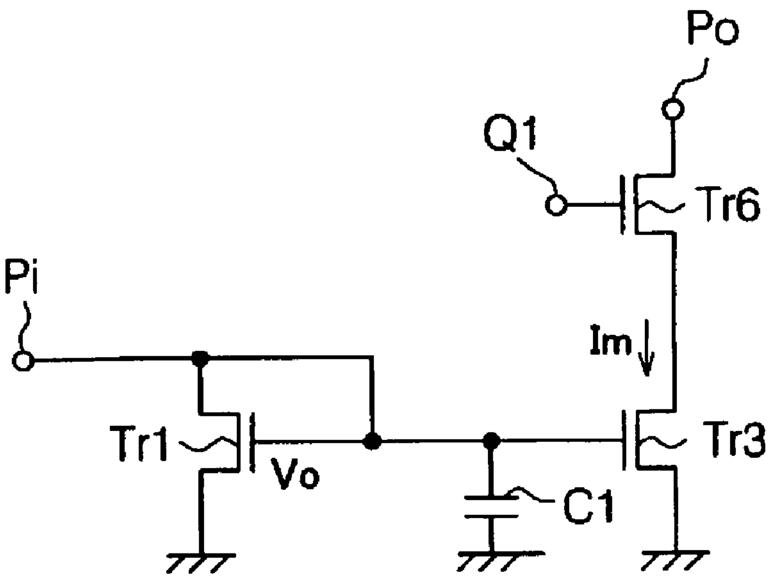
【Fig. 6】
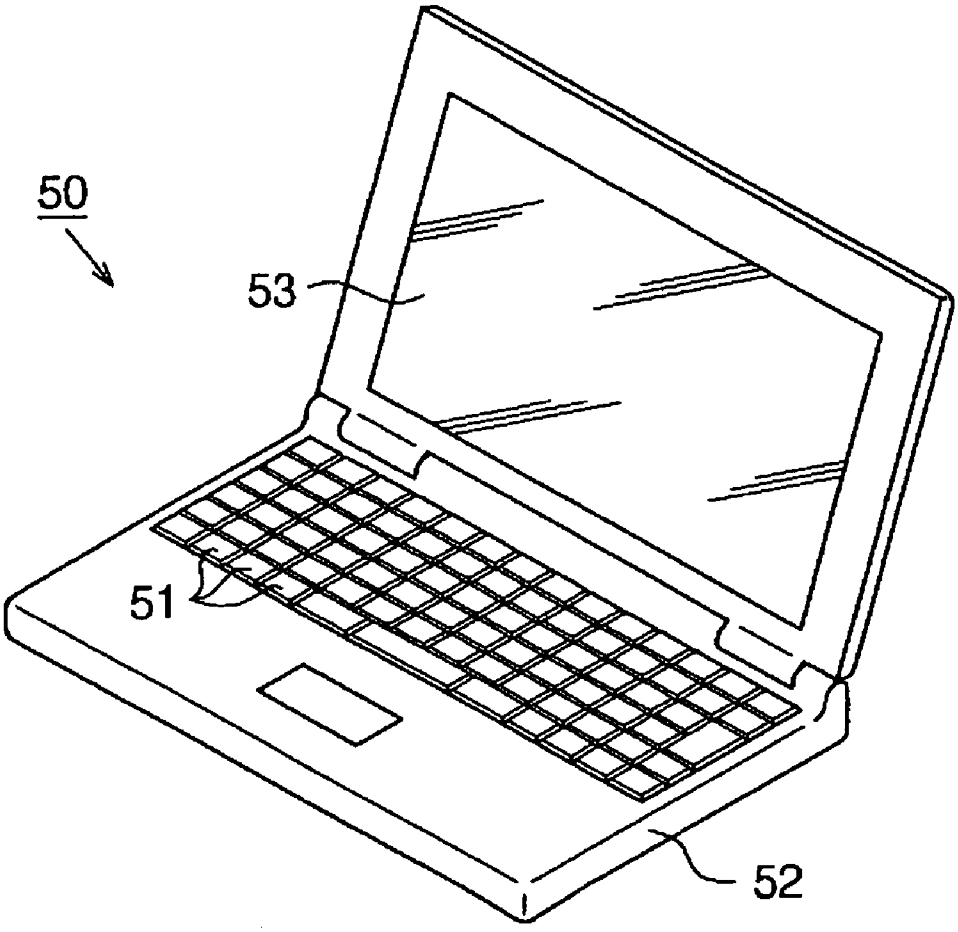

【Fig. 7】
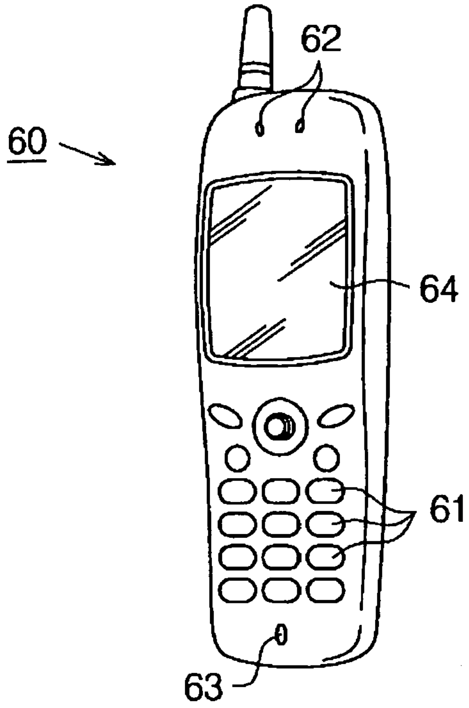
【Fig. 8】
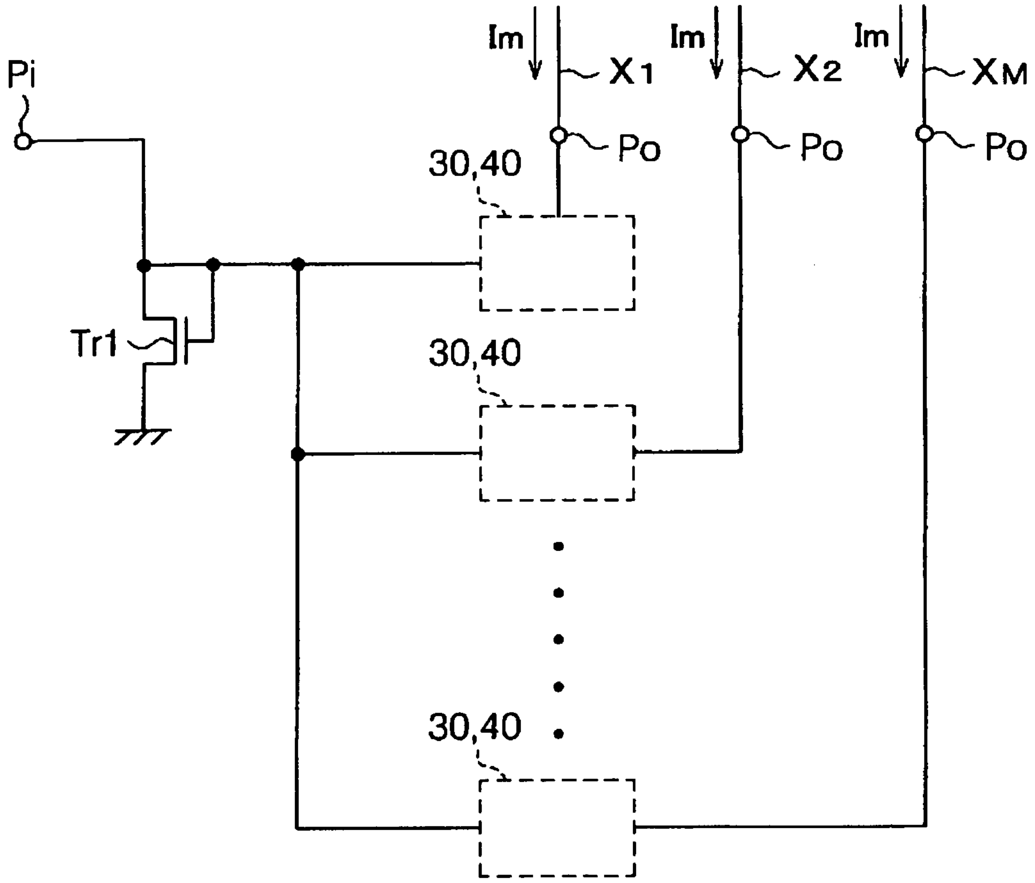

【Fig. 9】
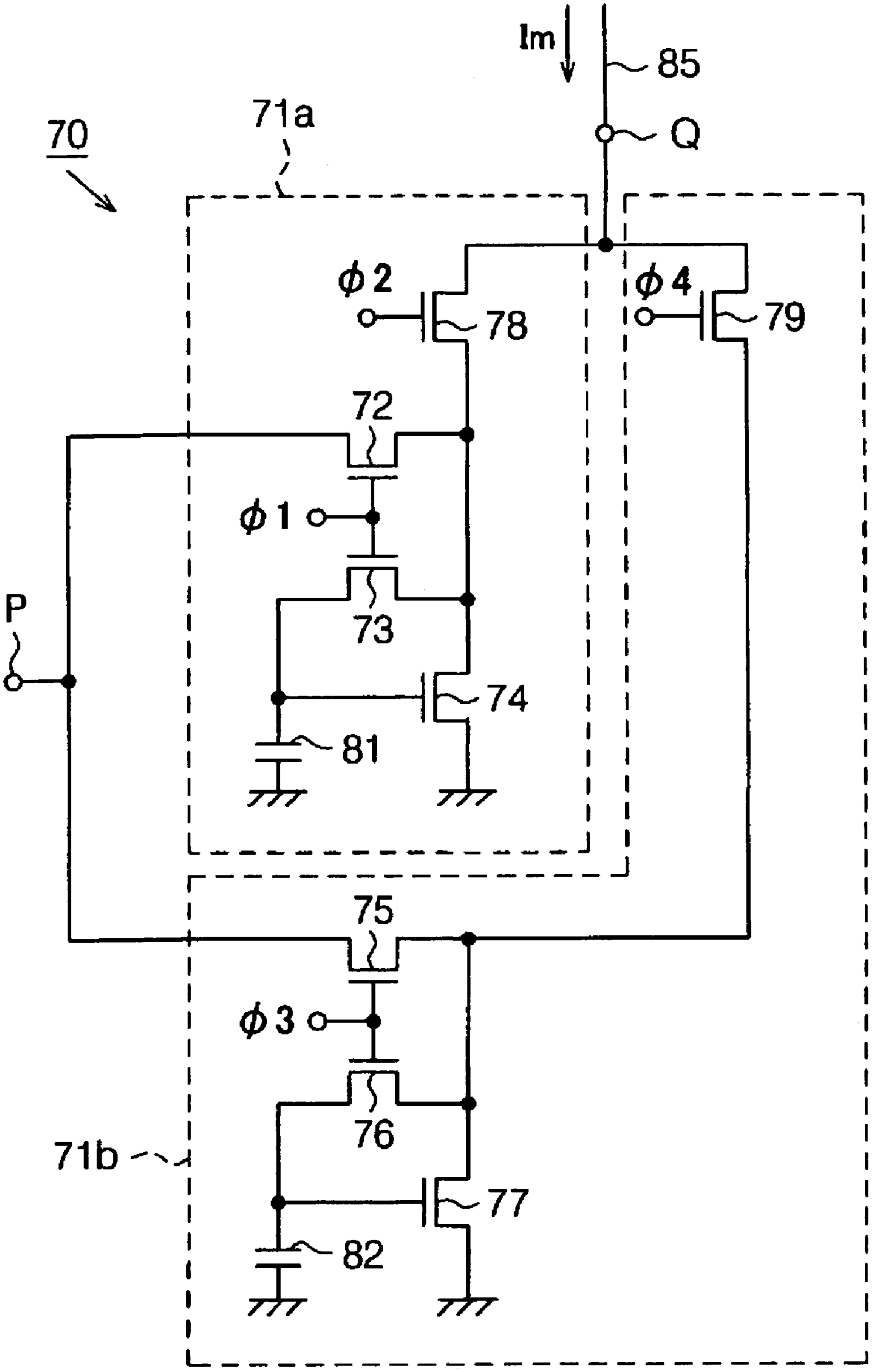

【Fig. 10】
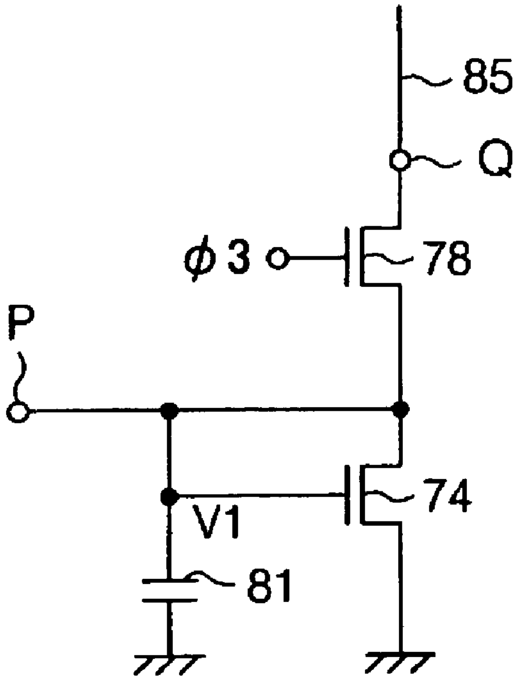
【Fig. 11】
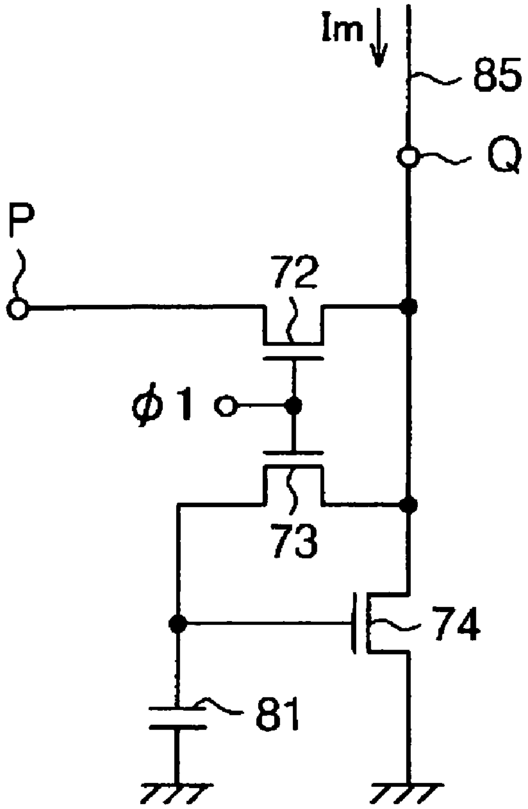

ELECTRONIC CIRCUIT, ELECTRONIC DEVICE, ELECTRO-OPTICAL DEVICE, AND ELECTRONIC APPARATUS

BACKGROUND OF THE INVENTION

1. Field of Invention

The present invention relates to an electronic circuit, an electronic device, and an electronic apparatus.

2. Description of Related Art

Related art electro-optical devices use organic electroluminescent (EL) elements. Because the organic EL elements are spontaneous emission elements, which do not need a back light, they can realize display devices with low power consumption, large viewing angle, and high contrast ratio.

The related art electro-optical device includes a data line driving circuit to supply to each pixel circuit a data signal according to the luminance gradation of the organic EL element. The data line driving circuit is connected to a controller to output image data. The data line driving circuit includes a plurality of single-line drivers connected to each pixel circuit through data lines. Each single-line driver generates a data signal on the basis of image data output from a controller and supplies the generated data signal to the pixel circuit. The pixel circuit supplies driving current to control the luminance gradation of the organic EL element on the basis of the data signal to the organic EL element (for example, as disclosed in Pamphlet of International Unexamined Application Publication No. W098/36407).

The electro-optical devices including an electro-optical element, such as an organic EL element, a liquid crystal element, an electrophoresis element, or an electron emission element, becomes larger and more accurate, and thus a problem occurs in that operation is delayed due to parasitic capacitance. In particular, in the case of the electro-optical device adopting a method of supplying a data signal as data current, such a problem is remarkable. That is, according to the wiring capacitance of the data line, data current may be supplied to each pixel circuit with low precision within a predetermined recording period. As a result, the recording operation of the data current in the pixel circuit is delayed. Accordingly, it is not possible to obtain correct gradation of an electro-optical element and to obtain accurate gradation of the electro-optical elements.

SUMMARY OF THE INVENTION

The present invention provides an electronic circuit, an electronic device, an electro-optical device and an electronic apparatus suitable to address or solve the above and/or other problems.

A first electronic circuit according to the present invention includes a first circuit and a second circuit. The electronic circuit outputs to a second signal line an output signal corresponding to an input signal supplied from a first signal line. Each of the first circuit and the second circuit includes a capacitive element to store a quantity of electric charge corresponding to the input signal, a first transistor whose conduction state is determined in accordance with the quantity of electric charge stored by the capacitive element, a second transistor to control a connection between the capacitive element and the first signal line, and a third transistor to control a connection between the first transistor and the second signal line.

Accordingly, it is possible to form a buffer circuit to output an output signal corresponding to an input signal.

In the above electronic circuit, the output signal may be a current signal.

In the above electronic circuit, the input signal may be a current signal.

In the above electronic circuit, it is preferable that the capacitive element of the second circuit not be electrically connected to the first signal line when the capacitive element of the first circuit is electrically connected to the first signal line through the second transistor of the first circuit.

Accordingly, it is possible to accurately input the input signal to the first circuit and the second circuit by alternately inputting the input signal to the first circuit and the second circuit forming the buffer circuit. Also, it is possible to use a period where any one of the first circuit and the second circuit receives the input signal as a period where the other circuit performs an output to the second signal line.

In the above electronic circuit, it is preferable that the first transistor of the second circuit not be electrically connected to the second signal line when the first transistor of the first circuit is electrically connected to the second signal line through the third transistor of the first circuit.

Accordingly, it is possible to accurately output the output signal corresponding to the input signal by alternately outputting an output signal from the first circuit and the second circuit. Also, it is possible to use a period where any one of the first circuit and the second circuit performs an output for the second signal line as a period where the other circuit receives the input signal. Accordingly, it is possible to effectively use time.

In the above electronic circuit, a fourth transistor to form a current mirror circuit for either the first transistor of the first circuit or the first transistor of the second circuit is preferably provided.

Accordingly, it is possible to form the buffer circuit by a simple circuit. Therefore, it is possible to reduce the size of the buffer circuit.

In the above electronic circuit, a fourth transistor to form a current mirror circuit for each of the first transistors of the first circuit and the second circuit is preferably provided.

Accordingly, it is possible to form the buffer circuit by a simple circuit. Therefore, it is possible to reduce the size of the buffer circuit.

An electronic device according to the present invention includes any one of the above electronic circuits and electronic elements.

Accordingly, it is possible to provide the buffer circuit formed of a simple circuit and an electronic device having electronic elements driven on the basis of an output signal output from the buffer circuit.

The above electronic device may comprise a plurality of unit circuits connected to the second signal lines. At least one of a plurality of unit circuits may drive the electronic elements on the basis of the output signal.

Accordingly, it is possible to drive an electronic element on the basis of the output signal output from the buffer circuit.

In the above electronic device, at least one of the electronic elements may be provided for each of the plurality of unit circuits. Each of the unit circuits may drive at least one of electronic elements.

In the above electronic device, the electronic elements may be current driven elements.

In the electronic device, the electronic elements may be electro-optical elements.

The current driven element or the electro-optical element may be, for example, an electro-luminescent (EL) element.

The EL element may be, for example, an organic EL element, whose light-emitting layer is formed of an organic material.

A second electronic circuit according to the present invention is provided for each of the plurality of data lines in order to drive an electro-optical device where pixel circuits are positioned corresponding to portions where a plurality of scanning lines intersects a plurality of data lines. The electronic circuit includes a first circuit and a second circuit. Each of the first circuit and the second circuit includes a capacitive element to store a quantity of electric charge corresponding to an input signal, a first transistor whose conduction state is set in accordance with the quantity of electric charge stored by the capacitive element, a second transistor to control a connection of the capacitive element to an input signal line to transmit the input signal, and a third transistor to control a connection of the first transistor to corresponding data lines among the plurality of data lines.

In the above electronic circuit, the capacitive element of the second circuit is not preferably connected to the input signal line when the input signal line is connected to the capacitive element of the first circuit through the second transistor of the first circuit.

It is possible to use a period where any one of the first circuit and the second circuit receives the input signal as a period where either the first circuit or the second circuit performs an output to the corresponding data line.

In the above electronic circuit, the first transistor of the second circuit is not preferably connected to the corresponding data line when the first transistor of the first circuit is connected to the corresponding data line through the third transistor of the first circuit.

It is possible to use a period where any one of the first circuit and the second circuit performs an output to the corresponding data line as a period where the other circuit receives the input signal. Accordingly, it is possible to effectively use time.

The electro-optical device according to the present invention includes the electronic circuit as a driving circuit to drive the plurality of data lines.

A first electronic apparatus according to the present invention is provided with the electronic circuit.

A second electronic apparatus according to the present invention is provided with the electronic device or the electro-optical device.

BRIEF DESCRIPTION OF THE DRAWINGS

FIG. 1 is a schematic circuit diagram illustrating a circuit structure of an organic electro-luminescent (EL) display according to a first exemplary embodiment;

FIG. 2 is a schematic circuit diagram illustrating an internal circuit structure of a display panel and a data line driving circuit;

FIG. 3 is a schematic illustrating a pixel circuit according to a first exemplary embodiment;

FIG. 4 is a schematic circuit diagram of a buffer circuit according to the first exemplary embodiment;

FIG. 5 is a schematic circuit diagram of a first buffer circuit according to the first exemplary embodiment;

FIG. 6 is a perspective view illustrating a structure of a portable personal computer according to a second exemplary embodiment;

FIG. 7 is a perspective view illustrating a structure of a mobile phone according to the second exemplary embodiment;

FIG. 8 is a schematic circuit diagram of a buffer circuit where a first transistor Tr1 is shared by two or more buffer circuits;

FIG. 9 is a schematic circuit diagram of a buffer circuit for a comparison with a structure illustrated in FIG. 4;

FIG. 10 is a schematic circuit diagram of a first buffer in a structure illustrated in FIG. 9;

FIG. 11 is a schematic circuit diagram of the first buffer in the structure illustrated in FIG. 9.

DETAILED DESCRIPTION OF PREFERRED EMBODIMENTS

Exemplary Embodiments

First Exemplary Embodiment

A first exemplary embodiment specifying the present invention is described below with reference to FIGS. 1 to 4. FIG. 1 is a schematic circuit diagram illustrating a circuit structure of an active matrix type organic EL display of as an electro-optical device. FIG. 2 is a schematic circuit diagram illustrating an internal circuit structure of a display panel and data line driving circuit. FIG. 3 is a schematic circuit diagram of a buffer circuit.

An organic EL display 10 includes a controller 11, a display panel 12, a scanning line driving circuit 13, and a data line driving circuit 14.

The controller 11, the scanning line driving circuit 13 and the data line driving circuit 14 of the organic EL display 10 may be formed of independent electronic parts, respectively. For example, each of the controller 11, the scanning line driving circuit 13 and the data line driving circuit 14 may be formed of a semiconductor integrated circuit device with one chip, respectively. Also, all or some of the controller 11, the scanning line driving circuit 13 and the data line driving circuit 14 may be formed of a programmable IC chip. The functions of all or some of the controller 11, the scanning line driving circuit 13 and the data line driving circuit 14 may be realized as software by programs recorded in the IC chip.

The controller 11 is electrically connected to the display panel 12 through the scanning line driving circuit 13 and the data line driving circuit 14. The controller 11 outputs image data for executing display on the display panel 12 to the scanning line driving circuit 13 and the data line driving circuit 14.

In the display panel 12, as shown in FIG. 2, pixel circuits 15 as a plurality of unit circuits having organic EL elements 16 are arranged in a matrix. The organic EL elements are electronic elements or electro-optical elements that are current driven elements having light-emitting layer formed of an organic material. The pixel circuits 15 are connected to the scanning line driving circuit 13 through a plurality of scanning lines Yn (n=1 to N; n is a constant) that extends in a row direction. Also, the pixel circuits 15 are connected to the data line driving circuit 14 through data lines Xm (m=1 to M; m is a constant) as a plurality of second signal lines that extends in a column direction.

Data current Im is output from the data line driving circuit 14 connected to the data lines Xm through corresponding data lines Xm.

The pixel circuits 15 control the luminance gradation of the organic EL element 16 in accordance with a driving signal output from the data line driving circuit 14 and the data current Im as output current.

More specifically, each of the pixel circuits 15, as shown in FIG. 3, includes a first switching transistor 211, a second switching transistor 212, a driving transistor 214 to control a current level supplied to the organic EL element 16 according to a conduction state, a light-emission controlling transistor 213 to control conduction between the driving transistor 214 and the organic EL element 16, and a capacitive element 230.

The first switching transistor 211 and the second switching transistor 212 control conduction between the data line Xm and the capacitive element 230. The data current Im passes through the driving transistor 214 and the second switching transistor 212 by turning off the light-emission controlling transistor 213 and turning on the first switching transistor 211 and the second switching transistor 212. Accordingly, a quantity of electric charge corresponding to the data current Im is stored in the capacitive element 230. Voltage based on the corresponding quantity of electric charge is applied to a gate of the driving transistor 214 and the conduction state of the driving transistor 214 is set. The data current Im is supplied to the organic EL element 16, the first switching transistor 211 and the second switching transistor 212 are turned off and the light-emission controlling transistor 213 is turned on. Thus, current according to the conduction state of the driving transistor 214 is set.

The scanning line driving circuit 13 selects a scanning line among a plurality of scanning lines Yn arranged in the display panel 12 on the basis of the image data output from the controller 11 and outputs a scanning line signal to the selected scanning line.

The data line driving circuit 14, as shown in FIG. 2, includes a plurality of single-line drivers 20 connected to the data lines Xm. Each of the single-line drivers 20 includes a current generating circuit 21 and a buffer circuit 22 as an electronic circuit inside.

The current generating circuits 21 connected to the controller 11 generate analog current on the basis of the image data output from the corresponding controller 11.

The buffer circuits 22 connected to the current generating circuits 21 sequentially output the data current Im almost being equal to the analog current generated from the corresponding current generating circuit 21 to the pixel circuit 15 through the data lines Xm.

More specifically, each of the buffer circuits 22, as shown in FIG. 4, includes seven transistors Tr1 to Tr7 and two capacitors C1 and C2. According to the present exemplary embodiment, the transistors Tr1 to Tr7 are n channel FETs.

The transistor Tr1 as a fourth transistor is connected to a diode. The drain of the transistor Tr1 is connected to an analog input terminal Pi. The source of the transistor Tr1 is grounded. The gate of the transistor Tr1 is connected to the drain of the transistor Tr2 as a second transistor through an input signal line L as a first signal line.

The gate of transistor Tr2 is connected to a first input port S1. The first control signal $\phi$1 is input to the gate of the transistor Tr2. The source of the transistor Tr2 is connected to the gate of the transistor Tr3 as the first transistor. The source of the transistor Tr2 and the gate of the transistor Tr3 are grounded therebetween via the first capacitor C1 as a capacative element.

The source of the transistor Tr3 is grounded. The drain of the transistor Tr3 is connected to the source of the transistor Tr6 as a third transistor. The drain of the transistor Tr3 is connected to an analog output terminal Po through the transistor Tr6.

Accordingly, a first buffer circuit 30 as a first circuit includes the transistors Tr2, Tr3 and Tr6 and the first capacitor C1.

The gate of the transistor Tr1 is connected to the drain of the transistor Tr4 as the second transistor through the input signal line L.

The gate of the transistor Tr4 is connected to a second input port S2. The third control signal $\phi$3 is input to the gate of the transistor Tr4. The source of the transistor Tr4 is connected to the gate of the transistor Tr5 as the first transistor. The source of the transistor Tr4 and the gate of the transistor Tr5 are grounded therebetween via the second capacitor C2 as a capacative element.

The source of the transistor Tr5 is grounded. The drain of the transistor Tr5 is connected to the source of the transistor Tr7 as the third transistor. The drain of the transistor Tr5 is connected to the analog output terminal Po through the transistor Tr7. The analog output terminal Po is connected to the data lines Xm.

Accordingly, a second buffer circuit 40 as the second circuit includes the transistors Tr4, Tr5, and Tr7 and the second capacitor C2.

A third input port Q1 is connected to the gate of the transistor Tr6 of the first buffer circuit 30. The second control signal $\phi$2 is input to the gate of the transistor Tr6. Similarly, a fourth input port Q2 is connected to the gate of the transistor Tr7. The fourth control signal $\phi$4 is input to the gate of the transistor Tr7.

The transistors Tr2, Tr4, Tr6 and Tr7 function as switching transistors, respectively. The transistors Tr1, Tr3 and Tr5 are driving transistors that function as current sources, respectively.

To be specific, the transistors Tr1, Tr3 and Tr5 have gain coefficients $\beta 1$, $\beta 3$ and $\beta 5$, respectively.

The gain coefficient ($\beta$) of the transistor is defined as $\beta = (\mu AW/L)$. $\mu$, A, W and L denote carrier mobility, gate capacitance, channel width and channel length, respectively.

When the transistors Tr1, Tr3 and Tr5 operate in a saturation region, current Io flowing to the transistors is expressed as $Io=(1/2)\beta(Vo-Vth)^2$. Vo denotes voltage between the gates and the source of the transistors Tr1, Tr3 and Tr5. Vth denotes threshold voltage of each of the transistors Tr1, Tr3 and Tr5. According to the present exemplary embodiment, it is assumed that the threshold voltages of the transistors Tr1, Tr3 and Tr5 are equal to each other.

Accordingly, the relative ratios of the current output from the transistors Tr1, Tr3 and Tr5 are determined to be $\beta 1$: $\beta 3$: $\beta 5$. According to the present exemplary embodiment, a state where the gain coefficients $\beta 1$, $\beta 3$ and $\beta 5$ of the transistors Tr1, Tr3 and Tr5 are equal to each other is taken as an example.

The operation of the buffer circuit 22 is described below with reference to FIG. 5.

FIG. 5 is a schematic that illustrates the equivalent circuit of the buffer circuit 22 when the first control signal $\phi$1 to turn on the transistor Tr2 (turning off the transistor Tr4) is input to the first input port S1. At this time, the second control signal $\phi$2 to turn off the transistor Tr6 is input to the third input port Q1.

The equivalent circuit of the first buffer circuit 30 illustrated in FIG. 5 forms a current mirror circuit by the transistors Tr1 and Tr3. The first capacitor C1 operates as a capacitor to store the quantity of electric charge corresponding to the current value in accordance with the input signal supplied between the source and the drain of the transistor Tr1. Therefore, current having a current level corresponding to the input signal supplied to an analog input terminal Pi flows between the source and the drain of the transistor Tr3.

The second control signal ϕ2 to turn on the transistor Tr6 is input to the third input port Q1. Current generated in the transistor Tr3 is output from the analog output terminal Po. The data current Im is supplied to the pixel circuit 15 through the data line Xm connected to the analog output terminal Po.

The analog current generated by the current generating circuit 21 is alternately input to first and second buffer circuits 30 and 40 by alternately controlling the first and second buffer circuits 30 and 40 by the first to fourth control signals ϕ1 to ϕ4, as described above.

According to the structure of the present exemplary embodiment, it is possible to process a recording operation from the controller 11 to the data line driving circuit 14 and a recording operation from the data line driving circuit 14 to the pixel circuit 15 in parallel. Accordingly, it is possible to actually obtain a longer recording period compared to a case where the data line driving circuit 14 is formed of only one buffer. Therefore, it is possible to more precisely and stably perform the recording operation of data current.

A buffer circuit 70 formed of eight transistors 72 to 79 and two capacitors 81 and 82 is illustrated in FIG. 9 in order to compare with the structure according to the present exemplary embodiment.

The transistors 72 and 73 are n channel FETs and function as switching transistors. The gates of the first and second transistors 72 and 73 are connected to each other and are controlled to be turned on and off by the first control signal ϕ1. The drain of the transistor 72 is connected to an analog signal input terminal P. The source of the transistor 72 is connected to the drain of the transistor 73. The source of the transistor 73 is connected to one side of the capacitor 81. The other side of the capacitor 81, that is, the electrode opposite to the electrode connected to the source of the transistor 73 is grounded.

The transistor 74 is an n channel FET and functions as a driving transistor for generating current corresponding to the quantity of electric charge stored in the capacitor 81. The gate of the transistor 74 is connected between the source of the transistor 73 and the capacitor 81. The source of the transistor 74 is grounded. The drain of the transistor 74 is connected to the drain of the transistor 73. The drain of the transistor 74 is connected to an analog signal output terminal Q via the transistor 78.

The gate of the transistor 78 is controlled to be turned on and off by the second control signal ϕ2. A first current output type buffer circuit (hereinafter, a first buffer) 71*a* includes the transistors 72, 73, 74, and 78 and the capacitor 81.

The transistors 75 and 76 are n channel FETs and function as switching transistors, respectively. The gates of the transistors 75 and 76 are controlled to be turned on and off by the third control signal ϕ3.

The drain of the transistor 75 is connected to the analog signal input terminal P. The source of the transistor 75 is connected to the drain of the transistor 76. The source of the transistor 76 is connected to one side of the capacitor 82. The other side of the capacitor 82, that is, the electrode opposite to the electrode connected to the source of the transistor 76 is grounded.

The transistor 77 is an n channel FET and functions as a driving transistor to generate current corresponding to the quantity of electric charge stored in the capacitor 82. The gate of the transistor 77 is connected between the drain of the transistor 76 and the capacitor 82. The drain of the transistor 77 is connected to the drain of the transistor 76. The drain of the transistor 77 is connected to the analog signal output terminal Q via the transistor 79. The fourth control signal ϕ4 is input to the gate of the transistor 79. The gate of the transistor 79 is controlled to be turned on and off by the control signal ϕ4.

A second current output type buffer circuit (hereinafter, a second buffer) 71*b* includes the transistors 75, 76, 77 and 79 and the capacitor 82. In the buffer circuit 70, the first buffer 71*a* is connected to the second buffer 71*b* through the analog input terminal P and the analog output terminal Q.

The analog signal input terminal P is connected to a current generating circuit (not shown). Analog current is input to the analog signal input terminal P in accordance with the image data output from the controller. The analog signal output terminal Q is connected to the data line 85. The data current Im almost being equal to the analog current output from the buffer circuit 70 is output to a pixel circuit (not shown) via the data line 85.

The first control signal ϕ1 of the first buffer 71*a* and the third control signal ϕ3 of the second buffer 71*b* are complementary to each other. Furthermore, the second control signal ϕ2 of the first buffer 71*a* and the fourth control signal ϕ4 of the second buffer 71*b* are complementary to each other. Similarly, when the transistors 72 and 73 are turned on by the first control signal ϕ1, the second control signal ϕ2 turns off the transistor 78. To the contrary, when the transistors 72 and 73 are turned off by the first control signal ϕ1, the second control signal ϕ2 turns on the transistor 78. When the transistors 75 and 76 are turned on by the third control signal ϕ3, the fourth control signal ϕ4 turns off the transistor 79. To the contrary, when the transistors 75 and 76 are turned off by the third control signal ϕ3, the fourth control signal ϕ4 turns on the transistor 79.

FIG. 10 is a schematic circuit diagram of the first buffer 71*a* when the first control signal ϕ1 to turn on the transistors 72 and 73 (turning off the transistors 75 and 76) is input. At this time, the transistor 78 is turned off. The first buffer 71*a* shown in FIG. 10 stores the quantity of electric charge for analog current generated by the current generating circuit in the first capacitor 81. Accordingly, driving voltage V1 corresponding to the quantity of electric charge stored in the capacitor 81 is applied between the gate and the source of the transistor 74. Thus, the transistor 74 becomes a current source that flows current almost being equal to the analog current (the data current) Im.

The first control signal ϕ1 to turn off the transistors 72 and 73 (turn on the transistors 75 and 76) is input to the transistor 72 and 73. The second control signal ϕ2 to turn on the transistor 78 is input to the transistor 78. FIG. 11 is a schematic circuit diagram of the first buffer circuit 71*a* when the second control signal ϕ2 to turn on the transistor 78 is input. Therefore, as shown in FIG. 11, the data current Im generated by the transistor 74 is output to the data line 85 through the analog output terminal Q.

At this time, in the second buffer 71*b*, the third control signal ϕ3 to turn on the transistors 75 and 76 is input and the analog current output from the current generating circuit is charged to the capacitor 82 via the analog input terminal P.

The analog current generated by the current generating circuit is alternately input to the first and second buffers 71*a* and 71*b*. Accordingly, the data current generated by the current generating circuit is sequentially output to the pixel circuit via the data line 85.

However, the circuit of the buffer circuit 70, as clearly shown in FIG. 8, has a higher number (eight) of transistors and is more complicated than the circuit shown in FIG. 4. Accordingly, a layout space of the data line driving circuit is required.

According to the electronic circuit and the electro-optical device of the present exemplary embodiment, it is possible to obtain the following characteristics.

(1) In the structure shown in FIG. 4 according to the present exemplary embodiment, the buffer circuit 22 includes the seven transistors Tr1 to Tr7 and the two capacitors, that is, first and second capacitors C1 and C2. Therefore, it is possible to reduce the number of transistors by one compared with the structure shown in FIG. 9. As a result, it is possible to simplify and facilitate the structure of the buffer circuit and to miniaturize the data line driving circuit 14.

(2) According to the present exemplary embodiment, the first and third complementary control signals $\phi 1$ and $\phi 3$ for alternately turning on and off the transistors Tr2 and Tr4 are input to the first input port S1 and the second input port S2 of the buffer circuit 22, respectively. The second and fourth complementary control signals $\phi 2$ and $\phi 4$ for alternately turning on and off the transistors Tr6 and Tr7 are input to the third and fourth input ports Q1 and Q4, respectively. Therefore, it is possible to use a period where any one of the first buffer circuit 30 and the second buffer circuit 40 receives the input signal as a period where the other buffer circuit performs output to the data lines Xm.

It is possible to effectively use time because it is possible to use a period where any one of the first buffer circuit 30 and the second buffer circuit 40 performs output to the data lines Xm as a period where the other buffer receives the input signal.

Therefore, it is possible to ensure the recording time of the input signal for the buffer circuit 22 and the recording time of the data current Im for the pixel circuit.

Second Exemplary Embodiment

An application of the organic EL display 10 as the electro-optical device explained in the first exemplary embodiment to an electronic apparatus is described below with reference to FIGS. 5 and 6. The organic EL display 10 can be applied to various electronic apparatuses, such as a portable personal computer, a mobile phone, or a digital camera, for example.

FIG. 6 is a perspective view illustrating a structure of a portable personal computer. In FIG. 6, a personal computer 50 includes a main body 52 with a keyboard 51 and a display unit 53 using the organic EL display 10.

In this case, the display unit 53 using the organic EL display 10 has the same effect as a display unit according to the above exemplary embodiment. As a result, it is possible to provide a portable personal computer 50 with a buffer circuit of a data line driving circuit that can be formed of a simpler circuit.

FIG. 7 is a perspective view illustrating a structure of a mobile phone. In FIG. 7, a mobile phone 60 includes a plurality of manipulation buttons 61, an earpiece 62, a mouthpiece 63 and a display unit 64 using the organic EL display 10. In this case, the display unit 64 using the organic EL display 10 has the same effect as a display unit according to the above exemplary embodiment. As a result, it is possible to provide the portable telephone 60 with a buffer circuit of a data line driving circuit that can be formed of a simpler circuit.

The present invention is not restricted to the above exemplary embodiments and may be performed as follows.

According to the above exemplary embodiments, the transistor Tr1 is shared by a group of the first and second buffer circuits 30 and 40. When the transistor Tr1 is shared by two or more groups of first and second buffer circuits 30 and 40 as shown in FIG. 8, it is possible to significantly reduce the number of transistors forming the data line driving circuit 14. At this time, the analog current generated by the current generating circuit 21 is input to the first and second buffer circuits 30 and 40 by turning on and off the first and third control signals $\phi 1$ and $\phi 3$ input to the input ports S1 and S2 of the transistors Tr2 and Tr4 of the first and second buffer circuits 30 and 40.

For example, in the display panel 12 with 200 data lines Xm, when the buffer circuit 22 is separately positioned in each data line Xm, if the structure shown in FIG. 9 is applied, the total number of transistors included in 200 buffer circuits 22 is 8×200 =1600. To the contrary, in the case where the structure illustrated in FIG. 4 is applied, when the transistor Tr1 is shared by the plurality of first and second buffer circuits 30 and 40, the total number of transistors is 1+6×200=1201. Accordingly, the number of transistors is reduced by about 25%. The reduction ratio of the transistors increases with the increase of the number of data lines Xm. Accordingly, it is possible to miniaturize the data line driving circuit 14.

In the above exemplary embodiments, the active matrix type organic EL display 10 is used. However, a passive matrix type EL element display may be used.

In the above exemplary embodiments, the gain coefficients $\beta 1$, $\beta 3$ and $\beta 5$ of the transistors Tr1, Tr3 and Tr5 are almost equal to each other. The gain coefficients $\beta 1$, $\beta 3$ and $\beta 5$ of the first, third and fifth transistors Tr1, Tr3 and Tr5 may vary. Accordingly, in the color organic display, in the case where the characteristics of the organic EL element 16 vary according to colors of red, green and blue, it is possible to appropriately control color balance when each of the gain coefficient $\beta$ changes for each of the buffer circuit connected to the corresponding data line.

In the above exemplary embodiments, the organic EL element 16 is used as the current driven element. The organic EL element 16 may be used as another current driven element. For example, the organic EL element 16 may be used as the current driven element, for example, a light-emitting element such as an LED or an FED.

In the above exemplary embodiments, the organic EL display 10 using the pixel circuit 15 with the organic EL element 16 is used as the electro-optical device. A display using a pixel circuit with an inorganic EL element whose light-emitting layer is formed of an inorganic material may be used as the electro-optical device.

In an electro-optical device with an electro-optical element such as a liquid crystal element, an electrophoresis element or an electron emission element, an electro-optical device to record data using current may be used as the electro-optical device.

In the above exemplary embodiments, an analog signal input to the analog input terminal Pi is analog current and includes the first transistor Tr to form a current mirror circuit to generate the data current almost being equal to the analog current. When the analog signal input to the analog input terminal Pi is an analog voltage and generates the data current corresponding to the analog voltage, it is possible to remove the first transistor Tr. Accordingly, it is possible to simplify and facilitate the buffer circuit.

What is claimed is:

1. An electronic circuit provided for each of a plurality of data lines directly connected to pixel circuits, the pixel circuits positioned corresponding to portions where a plurality of scanning lines intersects the plurality of data lines, the electronic circuit comprising:

a first circuit; and a second circuit;

each of the first circuit and the second circuit including:

a capacitive element to store a quantity of electric charge corresponding to an input electrical current signal;

a first transistor having a conduction state that is set in accordance with the quantity of electric charge stored by the capacitive element;

a second transistor to control a connection of the capacitive element to an input signal line for transmitting the input electrical current signal supplied from the input signal line connected to an electrical current generating circuit; and a third transistor to control a connection of the first transistor to a corresponding data line among the plurality of data lines, and to output to the corresponding data line an output electrical current signal in accordance with the quantity of electric charge stored by the capacitive element, when either the first circuit or the second circuit accepts the input electrical current signal, the other outputting to the corresponding data line the output electrical current signal, the third transistors of the first circuit and the second circuit being directly connected to the same data line of the plurality of data lines.

2. The electronic circuit according to claim 1, the capacitive element of the second circuit not being connected to the input signal line when the input signal line is connected to the capacitive element of the first circuit through the second transistor of the first circuit.

3. The electronic circuit according to claim 1, the first transistor of the second circuit not being connected to the corresponding data line when the first transistor of the first circuit is connected to the corresponding data line through the third transistor of the first circuit.

4. The electronic circuit according to claim 1, further comprising a common fourth transistor for forming a current mirror circuit for both the first transistor of the first circuit and the first transistor of the second circuit.

5. The electronic circuit according to claim 1, further comprising a fourth transistor to form a current mirror circuit for each of the first transistors of the first circuit and the second circuit.

6. The electronic circuit according to claim 1, the electrical current generating circuit generating analog electrical current based on image data output from a corresponding controller.

7. An electro-optical device, comprising:

a plurality of electro-optical elements; and an electronic circuit according to claim 1 as a driving circuit for driving the plurality of electro-optical elements.

8. The electro-optical device according to claim 7, the plurality of electro-optical elements being electro-luminescent (EL) elements.

9. The electro-optical device according to claim 8, the El elements having light-emitting layers formed of an organic material.

10. The electro-optical device according to claim 7, the electrical current generating circuit generating analog electrical current based on image data output from a corresponding controller.

11. An electronic apparatus, comprising:

the electronic circuit according to claim 1.

* * * * *